Nov. 28, 1961    C. G. SONTHEIMER    3,010,319
LIQUID QUANTITY MEASURING SYSTEM
Filed June 8, 1950    2 Sheets-Sheet 1
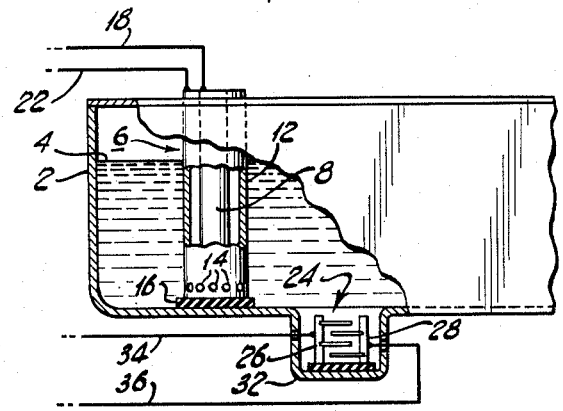
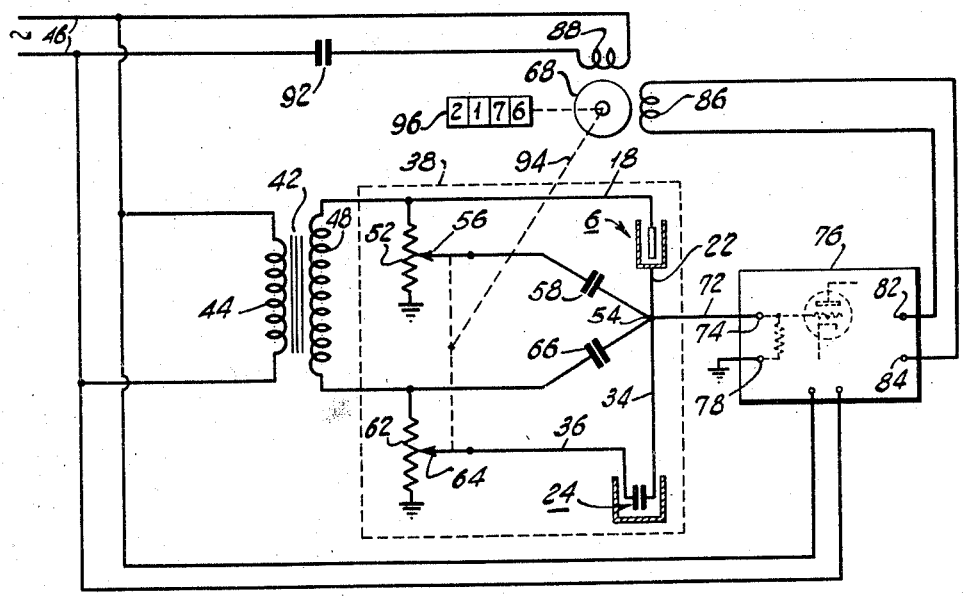
INVENTOR.
Carl G. Sontheimer
BY
Robert S. Dunham
ATTORNEY Nov. 28, 1961    C. G. SONTHEIMER    3,010,319
LIQUID QUANTITY MEASURING SYSTEM
Filed June 8, 1950    2 Sheets-Sheet 2

INVENTOR
Carl G. Sontheimer
BY
Robert S. Dunham
ATTORNEY

3,010,319
LIQUID QUANTITY MEASURING SYSTEM
Carl G. Sontheimer, Riverside, Conn., assignor to The Liquidometer Corporation, Long Island City, N.Y., a corporation of Delaware
Filed June 8, 1950, Ser. No. 166,898
7 Claims. (Cl. 73—304)

The present invention has primary utility in the art of measuring liquid levels by measuring the electrical capacitance of two or more spaced electrodes or plates exposed to the liquid. The invention particularly relates to an improved system for eliminating the errors in such measurements caused by differences in the dielectric constant and density of the liquids being measured.

The measuring element in such systems ordinarily is a condenser formed by two electrodes as concentric spaced metal cylinders that extend from the bottom to the top of the tank containing the liquid. Suitable openings are provided at the bottom of the outer cylinder so that the liquid will fill the space between the two cylinders to a depth corresponding to the level of the liquid in the tank.

A condenser, such as the one formed by these two concentric cylinders, has an electrical capacitance, the value of which depends upon the dielectric constant of the material between its plates. The greater the dielectric constant, the larger will be the capacitance of the condenser. As an example, suppose such a condenser has a given capacitance with air between the condenser plates. If the air is replaced completely with a liquid, say, gasoline having a dielectric constant about twice that of air, the capacitance of the condenser will be increased to twice its original value. If the air between the condenser plates is only partially replaced by the liquid, the condenser will have a proportionate intermediate value of capacitance.

It is apparent that if the capacitance of the condenser is to be used as a measure of the depth of a liquid, the dielectric constant of the liquid must be known accurately. This would present no serious difficulty if a particular gauge were always used to measure liquids having exactly the same dielectric constant. However, in practice it is desirable to use such a gauge for measuring liquids of different types having substantially different dielectric constants.

Even when a capacitance gauge is used to measure the depth of but a single type of liquid, it has been found that appreciable errors are often introduced because of differences in the dielectric constant of different batches of the liquid. For example, capacitance fuel gauges for measuring the depth of gasoline in a fuel tank, may be in error by a substantial amount because of the difference in the dielectric constant of different batches of gasoline.

It has previously been proposed to immerse a second condenser in the liquid being measured, so that the capacitance of this auxiliary condenser is a measure of the dielectric constant of the particular liquid, and to use this capacitance to off-set or compensate for variations in the readings caused by changes in the dielectric constant of the liquid. However, these earlier systems for the most part required the use of special precision type highly-stable inductors, or an additional electric motor under control of the auxiliary condenser for periodical readjustment of the measuring circuits.

It is an object of the present invention to provide a system for compensating automatically for changes in dielectric constant of the liquid being measured and which does not require such inductors, and does not require any additional motors or other expensive or bulky components. In the best embodiment of the invention thus far constructed, a balanceable network having four branches, each containing a condenser element, controls a reversible electric motor that adjusts simultaneously the voltage applied to two of the network branches in such direction as to maintain the network in a balanced condition. One of these condensers is the measuring condenser, responsive to the depth and dielectric constant of the liquid, another is the immersed auxiliary condenser, responsive only to the dielectric constant of the liquid, and the other two are fixed condensers, the values of which are independent of the dielectric constant of the liquid. The circuit permits also of automatic compensation for differences in density, so that the indicator may read directly the true weight of the liquid.

In one of its broader aspects the invention relates to systems for measuring the value of a first variable wherein the condition responsive element is also affected by a second variable, the effect of which it is desired to eliminate, and in which the value of the effect produced by the condition responsive element is a function of the difference between a constant and the second variable. In particular, the invention provides a system for compensating for the second variable so that the balance condition of an electrical network is independent of its value. For example, in the liquid level measuring system mentioned above, the values of the circuit elements are chosen according to the following principles. The capacitance of the measuring condenser $C_m$ is of the form:

$$(1) \qquad C_m = C_0 + XC_0(K-1)$$

where "$C_0$" is the capacity of the measuring condenser when none of the space between its plates is filled with liquid, "$K$" is the dielectric constant of the liquid, and "$X$" is a fraction between zero and unity representing the proportion of the total height of the condenser that is filled with liquid. Equation 1 may be derived by considering that the capacitance $C_m$ is equal to the capacitance of the measuring condenser below the level of the liquid plus its capacitance above the level of the liquid, or $XKC_0$ plus $(1-X)C_0$. This expression simplifies algebraically to become Equation 1.

In order to eliminate the effects of the quantity "$K-1$" from the balance condition of the network, a similar quantity is generated in another portion of the network and is combined with the signal from the measuring condenser in such manner that the resulting signal at the common point, under balance conditions, is independent of the quantity "$K-1$." To produce this compensating signal a first alternating voltage is coupled to a given point through a compensating condenser having spaced plates that are at all times immersed in a representative sample of the liquid so that its capacity $C_c$ is:

$$(2) \qquad C_c = KC_e$$

where "$C_e$" is the capacity which this compensating condenser would have if the liquid were not present.

A second alternating voltage, equal in magnitude to but opposite in phase from the first voltage is coupled to the same point through a fixed-value condenser having a capacitance $C_f$, which, because the dielectric constant in this example is unity, has a value $$(3) \qquad C_f = C_e$$

That is, the value of the capacitance of this condenser is equal to the value which the compensating condenser would have if removed from the liquid. If the dielectric constant were other than unity the fixed condenser would have a value such that the ratio relationship between its value and the value of the compensating condenser, free of the liquid, would be equal to the value of the constant. The operation of the above arrangement can be best understood by noting the expression for a theoretical equivalent circuit with only a single condenser. Because the voltages applied to the two condensers are equal but opposite in phase, the value of the capacitance of an equivalent condenser $C_R$, in the position of the compensating condenser, is the difference between the values of the compensating and fixed condensers, thus:

(4) $\qquad C_R = KC_e - C_e = C_e(K-1)$ were $C_R$ is the value of the equivalent condenser. The voltage produced at the given point is combined with the signal from the measuring condenser in such manner that when the actual magnitude of the voltage produced at the given point is adjusted by simultaneously varying the first and second voltages (applied, respectively, to the fixed and compensating condensers) to produce a null condition in the network, the effects of the dielectric constant are eliminated.

In particular applications it will be desirable to select a particular value for the compensating condenser depending upon the other network parameters. For example, in the detailed examples set forth herein, the compensating condenser, when free of the liquid, is selected to have a capacitance equal to that of the measuring condenser when the tank is empty, but such a selection of values is not necessary. Neither is it necessary for the voltage applied to the compensating condenser to have the same magnitude as the voltage of the opposite phase which is applied to the fixed-value condenser. These voltages, however, do maintain a fixed ratio of magnitudes irrespective of the adjustment of the network. It will be seen that the desired electrical quantity can be generated so long as the product of the admittance of the compensating condenser when free of the liquid and the voltage applied to it is equal to the product of the admittance of the fixed-value condenser and the voltage applied to it, or, if the constant is other than unity, to this product multiplied by that constant.

Various objects, advantages, and features of the invention will be in part apparent from and in part pointed out in the following description of three examples of the invention considered in conjunction with the accompanying drawings in which:

FIGURE 1 shows a tank with a portion of the side cut away to show a measuring condenser and an immersed condenser mounted therein for use in a system for measuring the level of liquid in the tank;

FIGURE 2 is a schematic diagram of electric circuits for measuring the liquid level in accordance with the present invention;

Corresponding parts have in some instances been designated by the same numbers throughout the several drawings.

Figure 3:
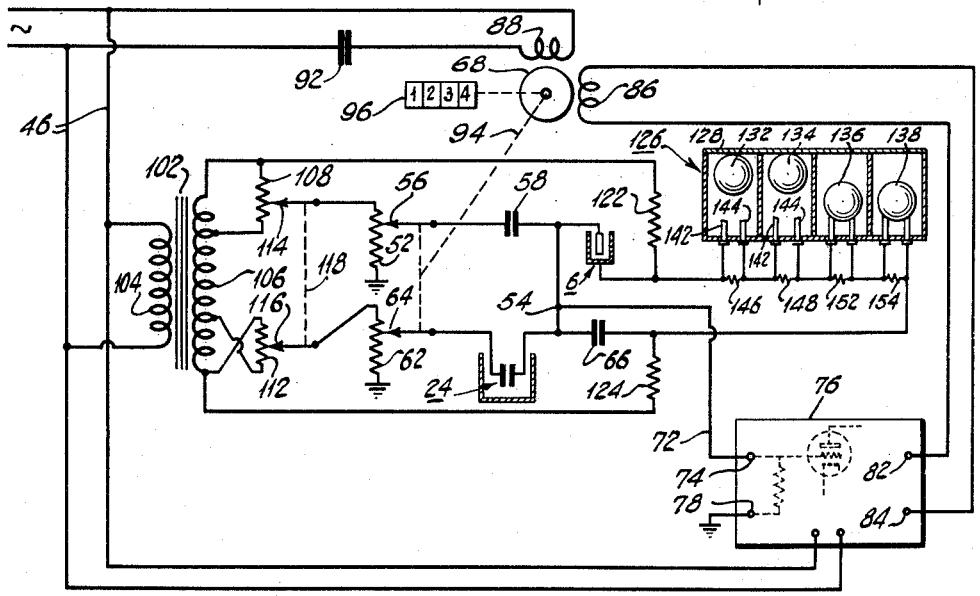
FIGURE 3 shows another form of the invention including automatic compensation for the density of the liquid so that the indicator can be calibrated in terms of weight.

As shown in FIGURE 1, a tank 2 contains a liquid 4, the depth of which is to be measured. The two plates of a measuring condenser, generally indicated at 6, are formed, respectively, by an inner cylinder 8 and an outer cylinder 12 spaced and electrically insulated from and positioned concentrically with respect to the inner cylinder. These cylinders, of metal or other suitable conductive material, are positioned vertically within the fuel tank, extending substantially from the top to the bottom thereof, and the outer cylinder is provided with suitable openings, as at 14, so that the level of the liquid 4 between the plates of the condenser 6 will correspond to its level in the tank 2. The cylinders or plates 8 and 12 are supported at the bottom and insulated from the metal portions of the tank 2 by a layer 16 of insulating material. Electrical connections to the inner and outer plates 8 and 12 of the condenser 6 are made, respectively, by two leads 18 and 22.

The capacity of the condenser 6 is a function of the depth of liquid in the tank 2, that is, of the proportion of the total height of the condenser 6 that is filled with liquid, and it is also a function of the dielectric constant of the liquid 4.

A compensating condenser, generally indicated at 24, is positioned in the tank 2 so that the spaces between its opposing sets of plates 26 and 28 are always filled with a representative sample of the liquid in the tank 2. In this example, the condenser 24 is shown positioned in a well 32 in the bottom of the tank. Electrical connections to this condenser are made by means of leads 34 and 36.

FIGURE 2 shows a circuit for measuring the level of the liquid 4 in the tank 2, the measurement being independent of the dielectric constant of the liquid. Power is supplied to a balanceable network, shown within the broken lines 38, through a transformer 42, the primary winding 44 of which is connected to supply mains 46, which in this example supply 400-cycle alternating current at a potential of 115 volts. One end of the secondary winding 48 of this transformer is connected to one end of a relatively low resistance wire-wound rebalancing potentiometer 52 and to the lead 18, which is connected to the inner plate of the measuring condenser 6, shown also in FIGURE 1. The outer plate of the condenser 6 is connected by the lead 22 to an output terminal 54 of the balanceable network within the broken line 38.

The opposite end of the potentiometer 52 is connected to the common ground circuit and its sliding contact 56 is connected through a fixed condenser 58 to the output terminal 54. The common ground circuit here conveniently provides, by way of example, a network or system reference point and serves as an electrical base for the illustrated circuit.

The other end of the transformer secondary winding 48 is connected to one end of a rebalancing potentiometer 62, identical with the potentiometer 52, and through a condenser 66 to the output terminal 54.

The opposite end of the potentiometer 62 is connected to ground and its sliding contact 64, which is ganged with the sliding contact 56 of the potentiometer 52, is connected by the lead 36 to one set of plates of the compensating condenser 24, shown also in FIGURE 1, the other set of plates of which is connected by the lead 34 to the output terminal 54.

In order to maintain the network in balanced condition, the voltage appearing between the common ground circuit and the output terminal 54 is used to control a reversible electric motor 68 that simultaneously adjusts the sliding contacts 56 and 64 of the potentiometers 52 and 62 to rebalance the network 38 and reduce the voltage at output terminal 54 to zero. To this end, the terminal 54 is connected by a lead 72 to an input terminal 74 of a conventional electronic amplifier, indicated in block form at 76, the other input terminal 78 of which is connected to the common ground circuit.

The output terminals 82 and 84 of the amplifier 76 are connected to one field winding 86 of the two-phase reversible motor 68. The other field winding 88 of this motor is connected through a phase-shifting condenser 92 to the alternating current supply mains 46. This motor is coupled mechanically through suitable reduction gearing, indicated diagrammatically by the broken line 94, to the sliding contacts 56 and 64 of the rebalancing potentiometers 52 and 62. A counter-type indicator 96 is also driven by the motor 68 and denotes the volume or depth of the liquid in the tank 4.

It will be seen in FIGURE 2 that a first alternating current is supplied to the output terminal 54 through the measuring condenser 6 and through the fixed condenser 58, and that a second current, of the same frequency but opposite in phase, is supplied to the output terminal 54 through the compensating condenser 24 and the fixed condenser 66. If these currents are equal they will just cancel each other at terminal 54 and no output signal will appear. If the two currents are unequal, an unbalance signal will appear at terminal 54, its phase depending upon which of these two currents is the larger. The direction of rotation of the motor 68 is controlled by the phase of the unbalance signal and is arranged to adjust the potentiometers 52 and 62 in such direction as to reduce this unbalance voltage to zero.

Let the capacity of the measuring condenser 6 when the tank 2 is empty be designated as "$C_0$," so that when the tank is filled with a liquid having a dielectric constant "$K$," its capacity becomes "$KC_0$." Then if the tank is partially filled, the capacity $C_m$ of the measuring condenser 6 will be:

(5) $$C_m = C_0[1 + X(K-1)]$$

where "$X$" is the fractional proportion of the total depth of the tank that is filled with liquid. Equation 5 may be derived algebraically from Equation 1 above.

The fixed condensers 58 and 66 in this example each have a capacity $C_0$, that is, a capacity equal to that of the measuring condenser 6 when the tank 2 is empty. The compensating condenser 24 has a capacity equal to $KC_0$, that is, its capacity is equal to that of the measuring condenser 6 when the tank 2 is full of liquid.

The voltages applied to the measuring condenser 6 and the fixed condenser 66 are equal and of opposite phase, the impedance of the transformer windinggs and the total resistances of the potentiometers 52 and 62 being assumed to be so small that they can be neglected in comparison with the impedances of the condensers in the balanceable network at the frequency of operation. The fixed condenser 66 and the measuring condenser 6 therefore can be considered as equivalent, for the purpose of explaining the operation of the network, to a single condenser in the position occupied by the measuring condenser 6, having a capacity $C_1$ equal to the difference between the capacities of measuring condenser 6 and the fixed condenser 66, thus:

(6) $$C_1 = C_0 X(K-1)$$

This equation may be derived on the basis that the condenser 66 is selected to have a capacitance $C_0$ equal to the capacitance of the condenser 6 when free of liquid, all in conjunction with Equation 5 above.

The effect of the condenser 66, therefore, is to eliminate by subtraction the constant term $C_0$ from the expression for the capacitance of the measuring condenser 6. Because the potentiometers 52 and 62 are of equal value and their sliding contacts 56 and 64 are always at corresponding positions on the two potentiometers, the voltages applied to the fixed condenser 58 and the submerged compensating condenser 24 are of equal value, but opposite in phase. These two condensers are equivalent to a second single condenser in the position of the compensating condenser 24, having a capacity $C_2$ equal to the difference between the capacities of the compensating condenser 24 and the fixed condenser 58, thus:

(7) $$C_2 = C_0(K-1)$$

The effect then, of the condensers 24 and 58 is to generate a signal that is proportional to "$K-1$" so that the corresponding term in the expression for the capacity of the equivalent condenser $C_1$ can be eliminated.

Under balance conditions, the current through $C_1$ must be equal to the current through $C_2$, so that these currents, which are opposite in phase, just cancel at terminal 54 and no current flows through the input circuit of the amplifier 76.

Accordingly, if the voltage delivered by the transformer winding 48 is denoted by "$2e$," so that the voltage across each of the potentiometers 52 and 62 is equal to "$e$," and if "$m$" is a proportionality factor depending upon the adjustment of the potentiometer contacts 56 and 64 such that the voltage between each of these contacts and ground is "$me$," then at balance condition, when the current through $C_1$ equals the current through $C_2$ (opposite phase) and their algebraic sum is equal to zero:

(8) $$e\omega C_0 X(K-1) - me\omega C_0(K-1) = 0$$

or (9) $$X - m = 0$$

and

(10) $$X = m$$

The term "$\omega$" in Equation 8 is a constant proportionality factor for expressing the capacity of condensers $C_1$ and $C_2$ in terms of admittance. Equation 8 is an expression for the equality of currents at a balance condition for the system, wherein currents are expressed as the voltage times the admittance.

The setting of the potentiometers 52 and 62 under balance conditions, therefore, is proportional to the depth "$X$" of the liquid 4 in the tank 2, but is independent of the dielectric constant of the liquid.

In the above-described arrangement, the readings on the indicator 96 are independent of the dielectric constant, but are dependent upon the depth of liquid in the fuel tank and, therefore, can be calibrated to indicate the volume of the liquid in the tank. However, for certain purposes it is desirable to know the actual weight of the liquid in the tank rather than its volume, which is subject to variation with changes in temperature. For example, the gauges used to measure the fuel supply in aircraft desirably indicate the true weight of the fuel, because the remaining flight time is a function of the weight of the fuel and is independent of variations in volume caused by changes in temperature of the fuel tanks.

FIGURE 3 shows such an arrangement wherein the indicator readings are independent both of the dielectric constant of the liquid and of its density, so that an accurate indication of the true weight of the liquid is provided.

Power is supplied to the measuring network by a transformer 102, the primary winding 104 of which is connected to the alternating current supply mains 46. A potentiometer 108 is connected across a portion of the secondary winding 106 of this transformer. An identical potentiometer 112 is connected across another portion of the secondary winding 106 near its opposite end. The sliding contacts 114 and 116 of these potentiometers 108 and 112, respectively, are ganged together, as indicated by the broken line 118, and ordinarily will be arranged for manual adjustment. These two potentiometers are provided so that the gauge can be calibrated to read correctly when the fuel tank is full.

In this embodiment of the invention the potentiometers 52 and 62 are connected respectively between the sliding contacts 114 and 116 of the potentiometers 108 and 112 and the common ground circuit. These potentiometers 52 and 62 function in the same manner and serve the same purpose as do the corresponding potentiometers in the embodiment shown in FIGURE 1, and the common ground circuit again provides, by way of example, a network or system reference point to serve as an electrical base for the circuit. The sliding contact 56 of potentiometer 52 is connected through the fixed condenser 58 to the output terminal 54, and the potentiometer contact 64 of the potentiometer 62 is connected through the submerged compensating condenser 24 to the output terminal 54.

One end of the secondary transformer winding 106 is connected through a fixed resistor 122 to the outer plate of the measuring condenser 6, the inner plate of which is connected to the output terminal 54. The other end of the secondary transformer winding 106 is connected through a fixed resistor 124 and the fixed condenser 66 to the output terminal 54.

A density responsive device, generally indicated at 126, is connected between the resistors 122 and 124 and modifies the voltages applied to the measuring condenser 6 and the fixed condenser 66 in accordance with the density of the liquid 4. This densitometer 126 may be of the type described more fully in an application of Clarence A. de Giers, Serial No. 127,076, filed November 14, 1949. This application matured into Patent No. 2,691,296, issued October 12, 1954 and later reissued as Re. 24,075, reissued October 18, 1955.

Briefly, the density responsive device 126, illustrated diagrammatically in FIGURE 3, comprises an outer case 128 which is provided with suitable openings (not shown) so that when the density responsive device is positioned in the bottom of the fuel tank 2, for example in the well 32, the interior of the case 128 is at all times completely filled with a representative sample of the liquid 2. The interior of the case 128 is divided into any desired number of separate compartments, in each of which is positioned a float as at 132, 134, 136 and 138. These floats differ slightly in specific gravity and are spread over the range of densities expected to be encountered with the particular liquids with which the tank 2 may be filled. If the density of a particular float is greater than that of the liquid 4, it will sink to the bottom of its compartment; and if it is lighter than the liquid, it will rise to the top of its compartment. These floats are arranged to operate switch mechanisms that control the magnitude of the resistance between the ends of resistors 122 and 124. These may be, for example, magnetic switches positioned outside the compartments so as to be controlled by the floats, which may be constructed of magnetic material. The switch arrangement is illustrated diagrammatically in FIGURE 3 by contact points 142 and 144 which extend into each of the chambers. Each float is arranged to engage one pair of these contacts when the float is at the bottom of its compartment.

Fixed resistors 146, 148, 152, and 154 are connected across respective pairs of the contact points, so that when a particular float is at the top of its compartment, the resistor across its particular pair of contact points 142 and 144 is effective in an external circuit; whereas when the float, which is provided with an outer conductive surface, is in its lower position, its particular set of contact points is connected together by the float so that the associated resistor is shunted out of the external circuit. The resistors 146, 148, 152, and 154 are connected in series between the ends of fixed resistors 122 and 124 as shown. The number of floats that engage their respective contact points at a particular time is dependent upon the density of the particular liquid being measured and accordingly the resistance between the ends of fixed resistors 122 and 124 is a function of the density of the liquid.

The unbalance voltage appearing at terminal 54 is fed to the amplifier 76 and controls the reversible two-phase motor 68 in the same manner as was described in connection with FIGURE 2. The motor 68 is mechanically connected to the sliding contacts 56 and 64 of the rebalancing potentiometers 52 and 62 through a suitable speed reducing and driving arrangement, indicated diagrammatically by the broken line 94.

The operation of this circuit can be explained in a manner similar to that set forth in connection with the arrangement shown in FIGURE 2. The measuring condenser 6 and the fixed condenser 66 are connected to opposite ends of the transformer winding 106 through identical fixed resistors 122 and 124, so that under balance conditions this combination is equivalent to a single condenser, having a capacitance $C_3$, in the position of the measuring condenser 6 and having a capacity equal to the difference in capacity of these two condensers. As pointed out above, the capacity of the measuring condenser 6 is

(11) $$C_m = C_0[1+(K-1)X]$$

and the capacity of condenser 66 is equal to the capacity of measuring condenser 6 when the tank is empty, and its capacity therefore can be designated as $C_0$. The capacity $C_3$ of the equivalent condenser then is:

(12) $$C_3 = XC_0(K-1)$$

Because the potentiometers 108 and 112 are identical and the sliding contacts 114 and 116 of these potentiometers are always adjusted to corresponding positions, and because the potentiometers 52 and 62 are identical with each other and their sliding contacts 56 and 64 also are at all times adjusted to corresponding positions, the two condensers 24 and 58 can be considered as equivalent, under balance conditions, to a single condenser in the position of the compensating condenser 24. The value ($C_4$) of the capacitance of this condenser then will be:

(13) $$C_4 = C_0(K-1)$$

The effective resistance of the combination of the resistors 146, 148, 152, and 154 is a function of the density of the liquid and the resistance values are so selected that this effective resistance, designated as R, is a function of the density of the liquid 4 such that

(14) $$\frac{R}{R+2r} = PD$$

where "$r$" is the resistance of each of the resistors 122 and 124, "$P$" is a proportionality constant, and "$D$" is the density of the liquid in the tank 2.

As in the earlier example, let the voltage delivered by secondary winding 106 be equal to "$2e$," so that the voltage delivered at contact 114 is equal to "$se$," where "$s$" is a multiplying factor depending upon the setting of the potentiometer contact 114, and the voltage delivered at potentiometer contact 116 will be equal to "$-se$." Let "$m$" also be a multiplying factor dependent upon the setting of potentiometer contacts 56 and 64 of potentiometers 52 and 62, so that the voltage delivered at sliding contact 56 of potentiometer 52 is equal to "$sme$," which is equal to, but opposite in phase from, the voltage delivered at sliding contact 64 of potentiometer 62. Now in the present example something less than voltage "$e$" is delivered to measuring condenser 6 and to fixed condenser 66 because of the voltage drops across resistors 122 and 124. The fraction of "$e$" which is delivered may be represented by the expression:

(15) $$\frac{\frac{R}{2}}{\frac{R}{2}+r}$$

which reduces to

(16) $$\frac{R}{R+2r}$$

If we assume that the resistance values of all of the resistors in the circuit are so small relative to the impedances of the condensers that their values may be neglected, then at balance condition when the voltage and current at output terminal 54 is zero:

(17) $$sme\omega C_0(K-1) - e\frac{R}{R+2r}\omega XC_0(K-1) = 0$$

or

(18) $$ms - \frac{R}{R+2r}X = 0$$

The substitution of "$PD$" for the term $R/R+2r$ in the above equation gives:

(19) $$ms - PDX = 0$$

or

(20) $$XD = \frac{sm}{P}$$

Under any given set of operating conditions, the values of "$s$" and "$P$" are fixed so that the quantity XD is proportional to the setting "$m$" of the potentiometer contacts 56 and 64.

If the plates of the measuring condenser 6 are so shaped that the factor "$X$" is proportional to the liquid volume "$V$," then

(21) $\qquad X=QV$

(22) $\qquad XD=QVD=QW$ where "$W$" is the weight of the liquid in the tank and "$Q$" is a constant. The indicator 96 therefore can be calibrated directly in terms of the weight of the liquid in the tank, and subsequent changes in the density or dielectric constant of the liquid will not affect the accuracy of the indications.

Figure 4:
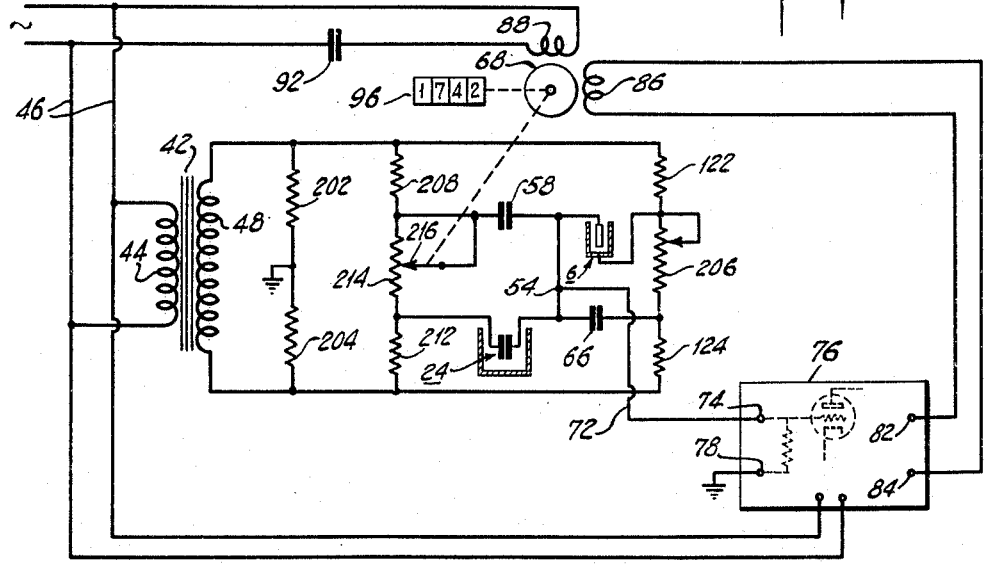
FIGURE 4 shows still another form of the invention in which a single potentiometer controls the rebalancing of the measuring network.

FIGURE 4 shows still another arrangement in which it is necessary to adjust only a single potentiometer in order to rebalance the network. Power is supplied to the system through the transformer 42, the primary winding 44 of which is connected to the alternating current supply lines 46. One end of the secondary winding 48 is connected to one end of a resistor 202, the opposite end of which is connected to the common ground circuit which again provides the network or system reference point and serves as the electrical base for the circuit. The other end of the secondary winding 48 is connected to one end of a resistor 204, which is identical in magnitude with the resistor 202, and the opposite end of which is also connected to the common ground circuit. These two resistors 202 and 204 provide a convenient method of obtaining a ground connection corresponding precisely to the midpoint of the secondary winding 48. The measuring condenser 6 is connected in series with the fixed resistor 122, in a manner similar to the arrangement of FIGURE 3, between one end of the secondary winding 48 and the output terminal 54.

The fixed condenser 66 is connected in series with the fixed resistor 124 between the opposite end of the secondary winding 48 and the output terminal 54. A variable resistor 206 is connected between the ends of the two fixed resistors 122 and 124 and may be manually adjusted, or may be replaced by any suitable density responsive device, for example, such as is shown in connection with FIGURE 3.

The other fixed condenser 58 is connected in series with a fixed resistor 208 between one end of the secondary winding 48 of the transformer 42 and the output terminal 54. The submerged compensating condenser 24 is connected in series with a fixed resistor 212, identical with resistor 208, between the opposite end of the secondary winding 48 and the output terminal 54.

A variable rebalancing resistance is provided by a potentiometer 214 connected between the ends of resistors 208 and 212 with its sliding contact 216 connected to one end of the potentiometer, so that adjustment of this contact controls the effective resistance of the potentiometer and therefore the voltage applied to the fixed condenser 58 and the compensating condenser 24. This adjustment rebalances the network in the manner similar to that described in connection with the earlier embodiments.

As in the previous examples, the output terminal 54 is connected through the amplifier 76 to a reversible electric motor 68 that is arranged to move the sliding contact 216 of potentiometer 214 in such direction as to maintain the network in balanced condition, and simultaneously to operate the indicator 96 which denotes the amount of liquid in the tank 2.

The invention has been illustrated herein by apparatus for measuring the amount of liquid in a tank filled partly with air and partly with liquid. It is apparent that in its broader aspects the invention can be readily applied, by those familiar with the particular art, to numerous other uses and applications. The basic arrangement set forth herein can also be used for measuring the level of the interface between two immiscible liquids having different dielectric constants. This is apparent by observing that the equation for the capacitance "$C_m$" of a measuring condenser extending through the liquid interface into the two liquids is of the general form:

(23) $\qquad C_m = C_0[K_T + x(K_B - K_T)]$

Where $C_m$ is the total capacity of the measuring condenser for any amount of filling $C_0$ is the empty capacity of the measuring condenser.
$K_T$ is the dielectric constant of the top liquid.
$K_B$ is the dielectric constant of the bottom liquid.
$x$ is the fractional proportion of the total depth of the tank that is filled with the bottom liquid.

The above expression does not include stray capacitances in the measuring condenser, however, this is a fixed quantity which, while it must be considered in an actual installation, can be neglected for purposes of explanation. It will be noticed that the above expression is in a generalized form when working with any two dielectric constants. In the top dielectric is air then $K_T=1$ and the expression reduces to that previously given.

The circuit arrangement may be identical with that shown in FIGURE 2, wherein 6 is the measuring condenser extending through the interface of the liquids and the compensating condenser 24 is immersed in the lower liquid, the level of which is to be measured. The voltages delivered by the secondary winding 48 of the transformer 42 to the measuring condenser 6 and the fixed condenser 66 are equal and of opposite phase as described in connection with FIGURE 2. The adjustable voltages applied to the compensating condenser 24 and the fixed condenser 58 from the potentiometers 52 and 62 need not be equal but must have a constant ratio at all times.

The capacity of fixed condenser 58 will be made equal to the "empty" capacity of condenser 24, that is, when the condenser is completely filled with the top liquid of dielectric constant $K_T$. Therefore, $C_{58}=C_{24}K_T$. Similarly the capacity of fixed condenser 66 will be made equal to the "empty" capacity of the measuring condenser $C_0$. Therefore, $C_{66}=K_T C_0$. Here again it is noticed that when $K_T=1$ the above relations reduce to $C_{58}=C_{24}$ and $C_{66}=C_0$ which is the case when the top "liquid" is air.

The circuit condition that must be established in the network to reduce the voltage between reference point 54 and the common ground circuit to zero can be determined from the above in accordance with the procedure set forth in the preceding examples. It will be seen that the balance condition of the network is independent of the dielectric constant of the liquid, the level of which is being measured.

It will thus be seen that I have provided a simple and effective apparatus for measuring the amount of liquid in a tank, and that the entire system can be constructed from readily available components by the application of techniques well known in the art. Relatively few parts are required to produce a highly satisfactory gauging system, and the total weight of the system is substantially less than systems hereinbefore proposed, the latter factor being of the utmost importance in connection with fuel gauges for aircraft and the like.

It is apparent from the examples set forth herein that the invention is not limited to measuring systems such as those described herein and can be modified in various manners to best suit the needs of a particular use, and that the examples set forth herein are given for the purpose of explaining to those having knowledge of the art how the invention may be applied in practical use, and are not intended to be exhaustive of the many possible applications, configurations, and arrangements in which the invention may be embodied without exceeding the scope or spirit of the following claims.

I claim:

1. In a measuring system wherein the capacitance of a measuring condenser including spaced electrodes extending through the surface of a liquid is utilized in part to measure the weight of the liquid in a tank, apparatus for eliminating the effect of variations in the dielectric constant and to compensate for the density of said liquid including a source of alternating current, a balanceable network the balance of which is independent of the dielectric constant of the liquid, having voltage distribution means coupled to said source and including first, second, third, and fourth alternating voltage supply terminals, said distribution means being arranged to produce an alternating voltage between each of said terminals and a common circuit connection, the voltages at said first and second terminals being of equal magnitudes and opposite phase, the voltages at said third and fourth terminals having varaible magnitudes of constant ratio and opposite phase, a measuring condenser responsive to the level and dielectric constant of the liquid to be measured connected between said first voltage supply terminal and a common reference connection, a compensating condenser immersed in said liquid and the capacity of which is proportional to the dielectric constant of said liquid and independent of its level connected between said third voltage supply terminal and said common reference connection, and first and second balancing condensers connected respectively between said second and fourth voltage supply terminals and said reference connection, the product of the capacity of said first balancing condenser and the voltage at said second terminal being equal under balance conditions to the product of the capacity of said measuring condenser when free of said liquid, and the voltage at said first terminal, the product of the capacity of said compensating condenser, when the dielectric constant of said liquid is unity, and the voltage at said third terminal being equal under balance conditions to the product of the capacity of said second balancing condenser and the voltage at said fourth terminal, variable-resistance density-responsive means connected to said network so as to control simultaneously the magnitudes of the voltages supplied to said measuring condenser and to said first balancing condenser as a functions of the density of said liquid, adjustable rebalance means for simultaneously varying the magnitudes of said third and fourth voltages to produce a balance condition in said network, an amplifier having input and output circuits, connecting means coupling said input circuit to said common circuit connection and said reference connection, a reversible electric motor connected to the output circuit of said amplifier and responsive to the phase of the unbalance signal of said network, means operatively connecting said motor with said adjustable rebalance means thereby to rebalance said network automatically, and a calibrated indicator under the control of said motor for denoting the weight of said liquid in said tank.

2. Apparatus for accurately indicating the quantity of liquid in a tank in units of weight, comprising: a source of voltage including a plurality of portions; measuring capacitive means connected to a first portion of said voltage source and located in the tank, so as to be immersed in the liquid therein to an extent dependent upon the height of the liquid in the tank, said measuring capacitive means providing a signal indicative of the height and the dielectric constant of the liquid; measuring empty container capacitive means connected across a second portion of said voltage source, which is opposite in phase to that of said first portion, and providing a signal equal in magnitude and opposite in phase to the portion of the signal from said measuring capacitive means indicative of no liquid in the tank; compensator capacitive means connected to a third and variable portion of said voltage source and positioned so as to be completely immersed in said liquid and providing a signal opposite in phase to the signal from said measuring capacitive means and of a magnitude indicative of the dielectric constant of said liquid; compensator empty container capacitive means connected to a fourth and variable portion of said voltage source and providing a signal equal in magnitude to and opposite in phase from the portion of the signal from said compensator capacitive means when the dielectric thereof is unity; density responsive means; means variably connecting said density responsive means to said voltage source for relatively controlling the potentials of the first and second portions thereof on the one hand as compared with the third and fourth portions thereof on the other hand, so as to introduce a density factor into the relative magnitudes of at least some of the signals; and means adding the four signals together and thereby providing an indication of the weight of the liquid in the tank.

3. Apparatus for accurately indicating the quantity of liquid in a tank in units of weight in accordance with claim 2, in which said means for adding the four siganls together comprises means connected to all of said capacitive means and responsive to the resultant of the signals therefrom and including reversible motor means for adjustably varying the variable portions of said source of voltage so that the resultant of all of said signals will be reduced substantially to zero, and means controlled by the signal responsive means for indicating the weight of liquid in the tank.

4. Apparatus for accurately indicating the quantity of liquid in a tank in terms of weight, comprising: a source of voltage including a plurality of portions; measuring capacitive means connected to a first portion of said voltage source and located in the tank, so as to be immersed in the liquid therein to an extent dependent upon the height of said liquid, and thereby to provide a signal indicative of the height and the dielectric constant of the liquid in the tank; compensator capacitive means connected to a second portion of said voltage source, which is opposite in phase from said first portion, and arranged to be completely immersed in said liquid and providing a signal opposite in phase to the signal from said measuring capacitive means and of a magnitude indicative of the dielectric constant of said liquid; compensator empty tank capacitive means connected to a third and variable portion of said voltage source and providing a signal equal in magnitude and opposite in phase from the signal from said compensator capacitive means when the dielectric thereof is unity; density-responsive means; means variably connecting said density-responsive means to said voltage source so as to control the relative potentials of said first portion of said voltage source with respect to the voltages of said second and said third portions of said voltage source; and means adding the three signals together and providing an indication of the weight of the liquid in the tank.

5. Apparatus for accurately indicating the quantity of liquid in a tank in units of weight in accordance with claim 4, in which said means for adding the three signals together comprises means connected to all of said capacitive means and responsive to the resultant of the signals therefrom and including reversible motor means for adjustably varying the potentials of the variable portions of said source of voltage so that the resultant of all of said signals will be reduced substantially to zero, and means controlled by the signal responsive means for indicating the weight of liquid in the tank.

6. In a system for measuring the weight of liquid in a container, wherein different liquids may be contained from time to time, having different dielectric constants, a balanceable network for wholly eliminating the effect on the measurement of variations in the dielectric constants of different liquids being measured, comprising a first condenser having electrodes which extend into a liquid being measured to an extent dependent upon the level thereof, a second condenser having electrodes which are completely immersed in the liquid being measured, third and fourth fixed condensers, a network reference point serving as an electrical base for the network, a source of alternating potential having first and second terminal portions, first circuit means connecting said first condenser to said first terminal portion of said alternating potential source, second circuit means connecting said third condenser to said second terminal portion of said alternating potential source, adjustable, resistance type, voltage dividing means for controlling the potential across said first and third condensers, means responsive to the density of a liquid being measured for adjusting said voltage dividing means; third adjustable circuit means connecting said second condenser to said second terminal portion of said alternating potential source, and fourth adjustable circuit means connecting said fourth condenser to said first terminal portion of said alternating potential source; a common point electrically connected to all four of said condensers, and voltage responsive means electrically connected to said common point and to said network reference point for adjusting said third and fourth adjustable circuit means to balance said network; the adjusted value of said third and fourth adjustable circuit means, when said network is balanced, being accurately indicative of the weight of liquid in the container.

7. Apparatus in accordance with claim 6, wherein said first circuit means comprises a circuit extending from said first terminal portion of said alternating potential source in series through a first fixed resistor and said first condenser to said common point; wherein said second circuit means comprises a circuit extending from said second terminal portion of said alternating potential source in series through a second fixed resistor and through said third condenser to said common point; and wherein said adjustable voltage dividing means comprises an adjustable resistance connected from said first to said second circuit means in parallel across the series-connected first and third condensers.

References Cited in the file of this patent

UNITED STATES PATENTS

| | | |
|---|---|---|
| Re. 24,075 | De Giers | Oct. 18, 1955 |
| 2,188,628 | Freystedt | Jan. 30, 1940 |
| 2,300,562 | Freystedt | Nov. 3, 1942 |
| 2,363,690 | Razek | Nov. 28, 1944 |
| 2,519,416 | Townsend | Aug. 22, 1950 |
| 2,541,743 | Brockman et al. | Feb. 13, 1951 |
| 2,563,280 | Schafer et al. | Aug. 7, 1951 |
| 2,581,085 | Edelman | Jan. 1, 1952 |

FOREIGN PATENTS

| | | |
|---|---|---|
| 441,576 | Great Britain | Jan. 22, 1936 |
| 114,980 | Sweden | Sept. 18, 1945 |